United States Patent

Bourbina

[15] 3,659,717

[45] May 2, 1972

[54] APPARATUS FOR REMOVING FLUID FROM A FOOD CONTAINER

[72] Inventor: Gerald W. Bourbina, Saginaw, Mich.

[73] Assignee: Baker Perkins Inc., Saginaw, Mich.

[22] Filed: June 9, 1969

[21] Appl. No.: 831,443

[52] U.S. Cl. .............................. 210/329, 134/134, 214/311
[51] Int. Cl. ....................................................... B01d 35/08
[58] Field of Search .................... 99/1, 100 P, 355, 443, 111, 99/214; 134/134; 210/65, 244, 248, 249, 251, 328, 329, 464, 469, 541, 542; 198/155; 214/311

[56] References Cited

UNITED STATES PATENTS

| | | | |
|---|---|---|---|
| 2,058,849 | 10/1936 | Bergen | 99/214 X |
| 2,119,596 | 6/1938 | Mintert et al. | 214/311 |
| R21,688 | 1/1941 | Van Ness | 210/244 X |
| 2,855,308 | 10/1958 | Buechele et al. | 99/100 |

*Primary Examiner*—Samih N. Zaharna
*Attorney*—Learman and McCulloch

[57] ABSTRACT

Apparatus for removing fluid, such as grease, from a food container in which food is cooked including mechanism for tilting the container to an inclined position so that the fluid will drain from the container in the inclined position, and a food restraining device which moves therewith. Apparatus is provided for initially lowering the food restraining device to a position adjacent the food so that the device will retain the food in the container during the tilting operation.

14 Claims, 4 Drawing Figures

Patented May 2, 1972

INVENTOR
GERALD W. BOURBINA
BY
Learman & McCulloch.

INVENTOR
GERALD W. BOURBINA
BY

Patented May 2, 1972

INVENTOR
GERALD W. BOURBINA

BY
Learman & McCulloch

Patented May 2, 1972

INVENTOR
GERALD W. BOURBINA

BY

APPARATUS FOR REMOVING FLUID FROM A FOOD CONTAINER

This invention relates to apparatus for removing fluid such as grease from food containers and more particularly to apparatus including means for retaining the food in its container when the container is moved to an inclined position to remove the fluid therefrom.

In recent years, there has been an ever increasing demand for foods which require a minimum of preparation by the user. To facilitate rapid preparation, foods are now being sold in a pre-cooked condition. These foods are commonly pre-cooked in disposable containers and then maintained in a frozen condition until the time of sale. Such food containers are usually formed of aluminum foil and are commonly referred to as "TV dinners." The purchaser need merely warm the food again in its aluminum container prior to serving it as a meal.

As is well known the container in which the food is cooked generally has grease, vegetable oil, or other similar cooking fats placed in the container to prevent the food from adhering to the container. Furthermore, when meats are cooked, the fats therein are melted down and appear as grease in the bottom of the container. Other foods are cooked in various types of fluids such as water. After the food is initially cooked, the fluids in the bottom of the container, or a portion thereof, should be removed from the container prior to further processing.

Accordingly, it is an object of the present invention to provide apparatus for removing cooking fluids from a container in which food is cooked.

It is another object of the present invention to provide an apparatus for removing grease from a group of foils being discharged from an oven while maintaining a maximum production rate.

It is a further object of the present invention to provide an apparatus for removing grease from a container while retaining the food in the container.

It is another object of the present invention to provide an apparatus for removing grease from a container in which food is cooked wherein apparatus for securing the food in the container may be moved with the container to a grease draining inclined position.

Briefly, in accordance with the present invention, there is provided fluid disposing apparatus for use in conjunction with cooking apparatus for cooking food in a food container including: means for moving the container forwardly along a predetermined path, means for moving the container about one side thereof relative to the path of travel thereof to an inclined position, and food restraining means for retaining the food in the container when it is in the inclined position.

Other objects and advantages of the present invention will become apparent from the following description and accompanying drawings in which.

Figure 2:
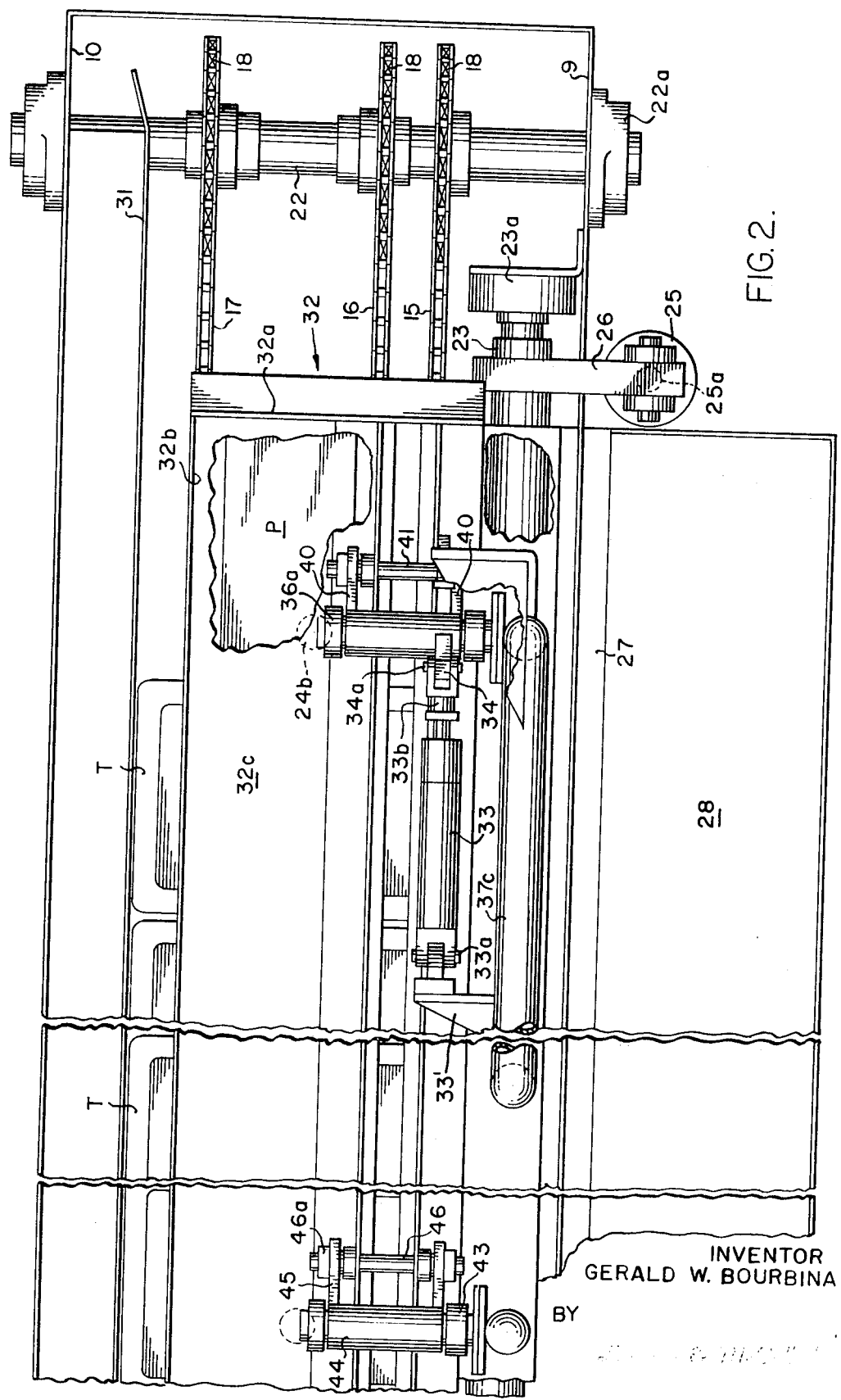
FIG. 2 is a top plan view of the apparatus shown in FIG. 1.
Figure 3:
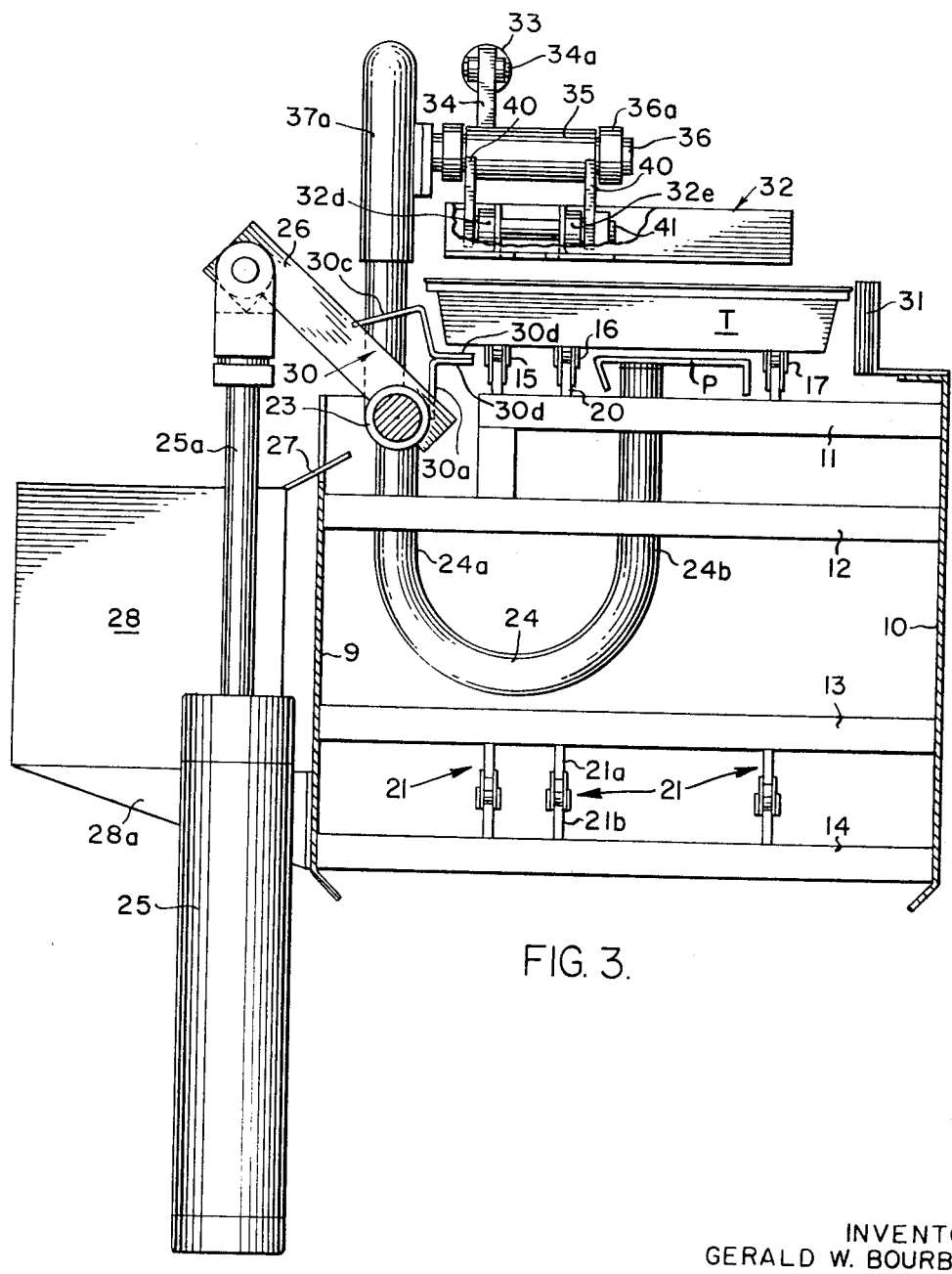
FIG. 3 is an end elevational view, in section, taken along lines 3 — 3 of FIG. 1.

Referring now more particularly to the drawings, a framework generally shown at F includes a pair of laterally spaced apart side walls 10 and 9 (FIG. 3) having a plurality of transversely extending and vertically spaced support beams 11 – 14 mounted on each end of the frame F. The tins T are conveyed from the oven (not shown), where the food is cooked in the containers, by laterally spaced apart, endless conveying chains 15, 16 and 17 trained around pairs of upper and lower sprockets 18 and 19 (FIG. 1) on each end of the frame F. At the upper end of the frame F, conveying chains 15, 16 and 17 ride on individual, spaced apart guides 20 and at the lower end of the frame they ride on a plurality of laterally spaced apart tracks, generally shown at 21, each comprising upper and lower guide members 21a and 21b supported by the transverse members 13 and 14 respectively. The upper sprocket members 18 are press fitted on, or otherwise suitably connected with to, a transversely extending shaft 22 (FIG. 2) which is journaled at, its opposite ends, in a set of bearing blocks 22a secured to the longitudinally extending side walls 10 and 9. The lower sprocket members 19 are similarly fixed on a lower transversely extending shaft 19a which is similarly mounted on walls 10 and 9.

Apparatus is provided for moving the containers T about one side thereof relative to their forward path of travel on the tin conveying chains 15 - 17 to an inclined position and includes a longitudinally extending rock shaft 23 journaled at its opposite ends in bearing blocks 23a which are secured to the side wall 10. One leg 24a of each of a pair of transversely extending U-shaped pipe sections 24 is secured to the lower side of shaft 23 in any suitable manner such as by welding. The free leg 24b of each of the U-shaped members 24 extends underneath the containers T and upwardly between the spaced apart runs of chains 16 and 17. Secured to the terminal portion of each of the free legs 24b in any suitable manner such as by welding is a support plate P which is engagable with the bottom of the containers T. The plate P provides the support for the containers T as they are moved to an inclined position as will be described more fully hereinafter.

Figure 4:
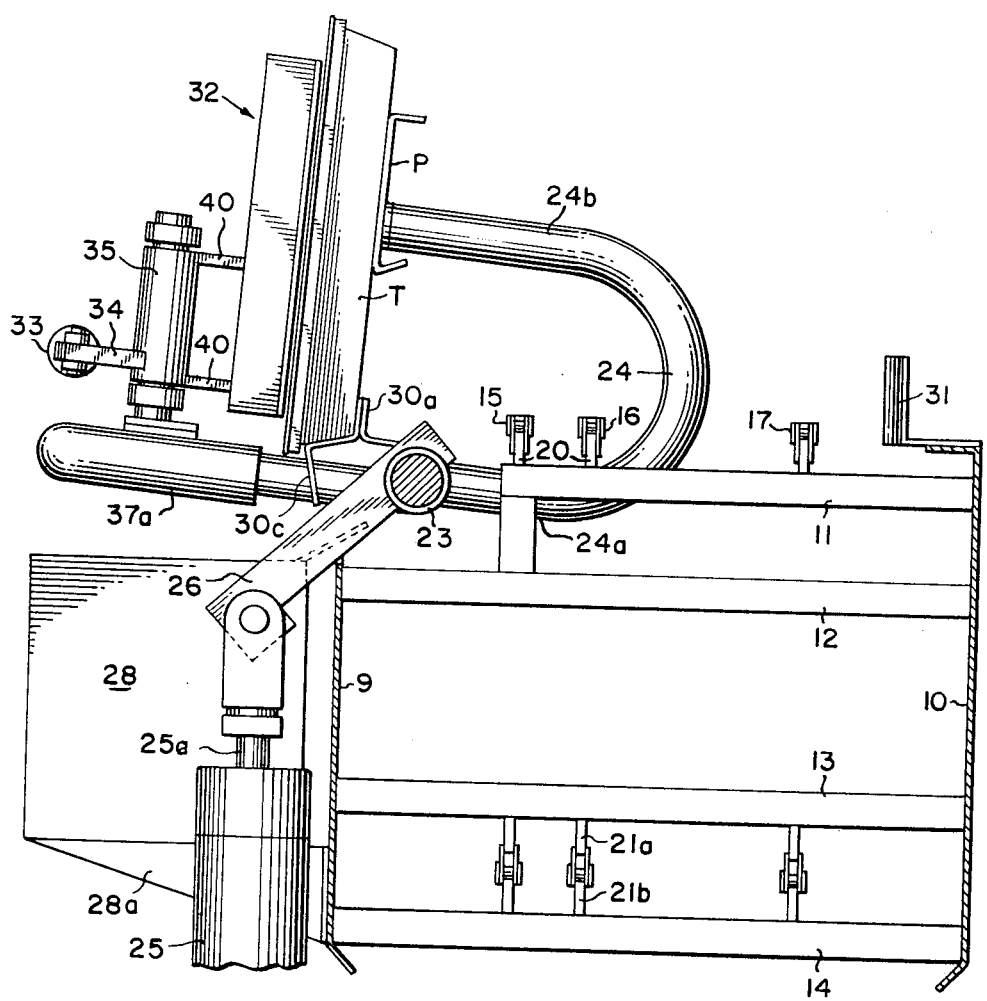
FIG. 4 is an end elevational view, similar to FIG. 3, illustrating certain parts in tilted positions.

The rock shaft 23 is also connected with an actuating air cylinder 25 by a link 26 connected at one end to the piston 25a of the air cylinder 25 and welded, or otherwise suitably fastened, at its other end to the rock shaft 23. Retraction of the piston rod 25a will move the pipe sections 24 and platform P upwardly through substantially an 85° arc to tilt the containers T on plate P to substantially vertical position as shown in FIG. 4. The tipping of the containers T will cause the fluid therein to spill down an apron 27, which is secured to the side wall 10, into a suitable receptacle 28 which may conveniently have an inclined bottom wall 28a. As can be best viewed in FIG. 1, the wall 10 has a cut-out portion at 10a to receive the link 26 when it moves from the position shown in FIG. 3 to the position shown in FIG. 4.

Adjacent the tin conveying chain 15 is a longitudinally extending, tray restraining wall, shown generally at 30, which has a lower portion 30a welded to the rock shaft 23 and an upper portion 30b inclined downwardly at its upper end 30c and flanged, at 30d, to provide a ledge which is welded to the flanged portion of the lower tray portion 30a. The tin restraining wall 30 prevents the containers T from sliding off the platform P when the rock shaft 23 rotates the container to the position shown in FIG. 4. As can be seen in the drawing, the restraining wall 30 tilts with the rock shaft 23 and platform P when the tins T are tilted to its near vertical position. To limit the lateral movement of the tins T in the opposite direction, a fixed longitudinally upstanding wall 31 is secured to the upper surface of opposite side wall 9 adjacent the conveyor chain 17.

Figure 1:
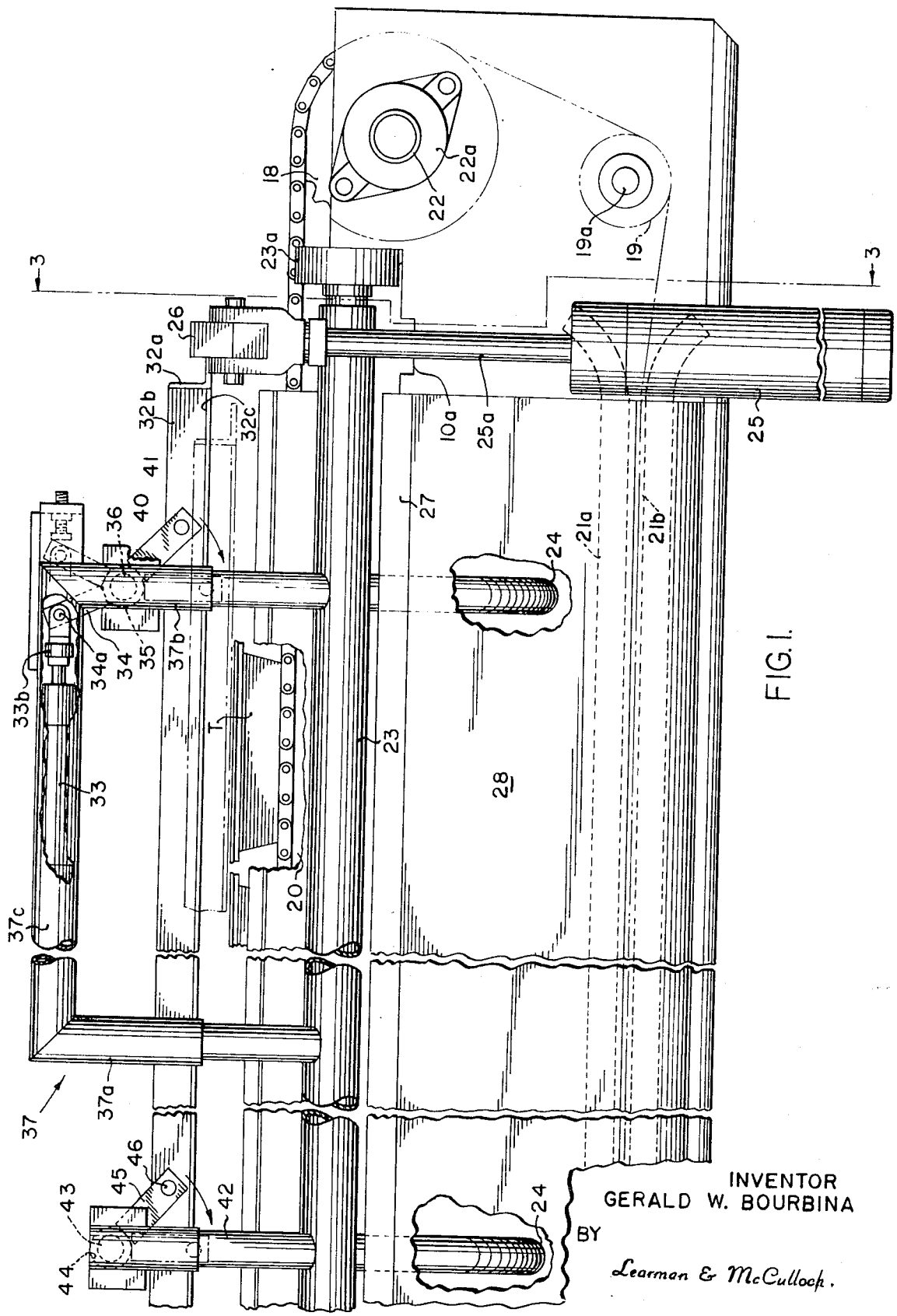
FIG. 1 is a longitudinal side elevational view of apparatus formed according to the invention, the housing being broken away to more clearly shown the parts thereof.

To prevent the contents of the containers T from being displaced due to the tilting action, a normally remotely disposed restraining cover member 32 is provided which is movable from the raised position illustrated in solid lines in FIG. 1 to the lowered position shown in chain lines in FIG. 1, in which latter position it is within about one-eighth inch of the top of the containers. The restraining cover member 32 includes a pair of end angle members, one of which is shown at 32a in FIG. 1, side walls 32b, and a bottom plate 32c secured between the side and end members. If desired, the bottom plate 32c can be a wire mesh member to reduce the weight thereof.

Apparatus is provided to move the restraining cover 32 between the raised and lowered positions, shown in FIG. 1, and includes an operating air cylinder 33 (FIG. 2) mounted on a bracket 33' (FIG. 2) by a pin member 33a and having its piston member 33b pivotally connected with a link 34 by means of pin 34a. The link 34 is rigidly connected to a collar 35 which is rotatably mounted on a rock shaft 36 supported on the vertically extending pipe 37a of a support member 37. The support member 37 includes a pair of longitudinally spaced apart, vertically extending pipes 37a and 37b having a rigidifying pipe member 37c connected between the upper ends thereof. The air cylinder mounting bracket 33' is fixed to the pipe member 37c. The pipes 37a and 37b are telescopically supported, as shown in FIG. 1, to provide a vertically adjustable support member 37 to accommodate various sizes of containers T. A collar 36a is mounted on the outer extremity of the shaft 36 and serves as a stop member to retain the collar 35 thereon. A pair of laterally spaced apart links 40 are welded or otherwise suitably secured to the lower portion of the collar 35. The restraining cover 32 has laterally spaced apart trunnions 32d and 32e (FIG. 3) pivotally connected with link members 40 by a transversely extending pivot pin 41 extending through aligned bores in the lower portions of link members 40 and trunnions 32d and 32e.

One or more additional vertically adjustable, cover supporting members 42 (FIG. 1) may be connected with the rock shaft 23 to form a support for a rock shaft 43 extending transversely above the cover 32. A collar member 44 having laterally spaced apart links 45 rigidly secured thereto may be mounted on the rock shaft 43. The lower portion of the links 45 are secured to the cover 32 by means of a pivot pin 46 extending through trunnions 46a (FIG. 2) attached to the bottom plate 32b of cover 32.

In operation, food is placed in the containers T along with cooking fluids such as grease, margarine, or other cooking oils. The containers are then placed in an oven where they are pre-cooked for a suitable predetermined time. During the cooking operation, additional grease and other fluids in the food will collect in the bottom of the container. The containers T are moved along the endless conveyor chains 15, 16 and 17 until they are adjacent the food restraining cover 32. The cylinder 33 is actuated to move the collar member 35 about the rock shaft 36 clockwisely as viewed in FIG. 1 to move the cover 32 downwardly. The collar member 44 and cover supporting links 45 follow the movement of links 40 and cover 32 to move the links 45 to their vertical positions, illustrated in chain lines in FIG. 1. When the cover 32 moves from its full line position to the dotted line position shown in FIG. 1, it is slightly above the top of the containers T. With the cover 32 thus lowered, the piston member 25a of cylinder 25 is retracted from the position shown in FIG. 3, to the position shown in FIG. 4, and the U-shaped members 24 and plate P move upwardly to move the containers T to the inclined position shown in FIG. 4. The orbiting of container 32 to the inclined position is effective to cause the fluids and grease therein to flow over the drip plate 27 to the container 28. As can thus be seen, the cover 32 orbits with the container T through substantially one quadrant of a circle. With the fluids and grease thus removed, the piston 25a is raised to the position shown in FIG. 3 and the link 26 returns the U-shaped posts 24 to original starting position so that the containers T now rest on endless conveyor chains 15, 16 and 17 and can be transported along for further processing.

The invention is defined in the claims.

I claim:

1. Food container handling apparatus comprising:
    means for advancing open containers forwardly along a predetermined path of travel to a container tilting station;
    means for moving a container positioned at said tilting station generally about one lateral side thereof relative to said forward path of travel to an inclined position;
    food restraining means for retaining food in said container in the inclined position, one of said food restraining means and said container being movable relative to the other between a remote, inoperative position and a food retaining position adjacent the other; and
    means at said container tilting station for moving said one of said food restraining means and said container between said remote, inoperative position and said adjacent, operative, food retaining position.

2. The combination as set forth in claim 1 wherein said first mentioned moving means includes means for tilting said food restraining means with said container.

3. The combination as set forth in claim 1 wherein said first mentioned moving means includes means for tilting said container through an arc of about 85°.

4. The combination as set forth in claim 1 wherein said first mentioned moving means includes a generally U-shaped member for supporting the underside of said container as it is being tilted.

5. The combination as set forth in claim 4 wherein one leg of said generally U-shaped member terminates in a support plate engagable with the underside of said container.

6. The combination as set forth in claim 4 including a shaft supporting said U-shaped member; said tilting means including means for moving said shaft about its own axis.

7. The combination as set forth in claim 4 wherein said advancing means comprises a plurality of laterally spaced apart members; and the terminal end of one leg of said generally U-shaped member extends between said laterally spaced apart members.

8. The combination as set forth in claim 1 including means for laterally restraining said container in the inclined position.

9. The combination as set forth in claim 8 wherein said container restraining means is mounted on said last mentioned moving means and movable therewith.

10. The combination as set forth in claim 19 wherein said means for moving said food retaining means includes means for lowering and raising said food retaining means from a removed position to a position adjacent the food in said container and return before and after the tilting operation respectively.

11. The combination as set forth in claim 10 wherein said means for raising and lowering said food restraining means is carried on said tilting means.

12. The combination as set forth in claim 11 wherein said means for raising and lowering said food restraining means comprises means pivotally mounted about a longitudinally extending axis; and adjustable stop means for limiting the downward movement of said food restraining means.

13. Container handling apparatus for separating liquid and solid substances carried in a container and comprising:
    means for advancing a container forwardly along a predetermined path of travel to a container tilting station;
    means for lifting said container upwardly from said advancing means;
    means for moving said container to a tilted position to drain the liquid substance therefrom; and
    restraining means for retaining the solid substance in said container while permitting the liquid substance to drain therefrom when the container is in the tilted position 14. Food container handling apparatus comprising:
    conveyor means for advancing liquid and food carrying containers forwardly along a path of travel toward a liquid draining station;
    means for tilting a container, positioned at said station, about one side thereof to an inclined position to drain the liquid therefrom;
    means at said station, past which said conveyor means travels, movable from a remote inoperative position to an operative position adjacent said container for retaining the food in said container while the liquid is being drained; and
    means for moving said food retaining means between said inoperative and operative positions.

* * * * *